US012563646B2

(12) United States Patent
Summerfield

(10) Patent No.: US 12,563,646 B2
(45) Date of Patent: Feb. 24, 2026

(54) AUTO HEAT LAMP

(71) Applicant: Gideon Summerfield, London (GB)

(72) Inventor: Gideon Summerfield, London (GB)

( * ) Notice: Subject to any disclaimer, the term of this patent is extended or adjusted under 35 U.S.C. 154(b) by 863 days.

(21) Appl. No.: 17/864,491

(22) Filed: Jul. 14, 2022

(65) Prior Publication Data

US 2024/0023210 A1 Jan. 18, 2024

(51) Int. Cl.
*H05B 6/50* (2006.01)

(52) U.S. Cl.
CPC .................................... *H05B 6/50* (2013.01)

(58) Field of Classification Search
CPC ...... H05B 3/0071; H05B 3/0076; H05B 3/06; H05B 3/16; H05B 6/50; H05B 2203/022; H05B 2203/032
See application file for complete search history.

(56) References Cited

U.S. PATENT DOCUMENTS

| | | | | |
|---|---|---|---|---|
| 4,942,046 A * | 7/1990 | Scott | A47J 36/2483 | 426/520 |
| 2021/0038018 A1* | 2/2021 | Hundley | A47J 36/2488 | |
| 2023/0128211 A1* | 4/2023 | Shin | A47J 37/0629 | 219/620 |

* cited by examiner

*Primary Examiner* — Hung D Nguyen

(57) ABSTRACT

A novel form of food heating lamp is disclosed with built-in sensors for auto-detection of food. This exemplary innovation provides sensors capable of measuring distance and can be added or replaced to be readily used in food warming equipment already in the field to allow for this energy saving capability to be widely enabled at low cost. The associated application allows easy control, reminders, notifications and reporting on user request.

2 Claims, 11 Drawing Sheets

AUTO HEAT LAMP

COPYRIGHT NOTICE

A portion of the disclosure of this patent document contains material which is subject to copyright protection. The copyright owner has no objection to the xeroxographic reproduction by anyone of the patent document or the patent disclosure in exactly the form it appears in the Patent and Trademark Office patent file or records, but otherwise reserves all copyright rights whatsoever

BACKGROUND

Field of the Invention

The present invention relates to keeping food and beverages warm. More specifically, this invention relates to an energy-saving system for food warming equipment with food presence sensor.

DESCRIPTION OF THE RELATED ART

In private residences, restaurants, hotels, and other locations, it is desirable to keep the food warm and at an enjoyable temperature. Cooling of food and beverages, gives food and beverages an unpleasant and cold taste and maximizes the loss in quality of food and beverages. This also affects many seniors, small children, and guests in the restaurants that often eat or drink food and beverages slowly and/or want to enjoy their food and beverages, thereby food and beverages become cool and not enjoyable to eat or drink.

Re-heating food that has been left to cool such as on the cooker or in the microwave is time-consuming and inconvenient, especially while guests are waiting.

Typically, the food is heated from above to prevent the crockery carrying the food becoming too hot. Overhead food warmers work by the food being placed under a thermal radiation source, typically a heating element or a strong light such as a halogen lamp. Sometimes called a gantry, this equipment may incorporate multiple heat sources laid out in a linear fashion, and sometimes on multiple tiers. Having 3 or 4 heat sources per metre is not unusual.

Typically, the entire unit, which may have many heat sources, is operated by a single switch or dimmer. These units tend to be turned on at the start of a meal service (the period of time food is prepared and served eg. lunchtime) and not turned off until the meal service has finished. So, even if only one part of the gantry is being used all the heat sources remain on, wasting energy whether or not food is beneath them. For a restaurant that serves lunch and dinner, these units may be powered on for more than 8 hours a day. Each heat source typically consumes between 250 and 500 W. For a typical restaurant with a small gantry consisting of six 300 W lamps, say, nearly 16,000 kWh in a year would be consumed for keeping food warm in this way. This is exceptionally wasteful when food is usually under lamps for only a fraction of the time. It is thought that this consumption could be at least halved if each heating unit was only active when food was under it, saving money and reducing a business' carbon footprint.

By looking at prior art multiple devices have been proposed. Lighting, especially exterior security lights, are often fitted with sensors so that they are powered on automatically when there is a person or object nearby. Working as well with energy saving lighting, as traditional lights, this is more to avoid light pollution and distraction than to save energy. These solutions incorporate motion sensors that respond to activity over a large area. For this reason, this type of solution is not suitable in a kitchen environment where you would expect a lot of motion in the vicinity of the heat source either side of the equipment whether or not food was present.

Another approach is Electric outdoor heaters, which are often fitted with timer switches to ensure they are not left on and waste energy when no one is present. Pressing the button activates the heat source for a short while, say 3 minutes, after which it turns off. If no one is around to press the button no heat is wasted after this time. A retro fit solution would not be possible in a food warming application as the timer switch would need to be too close to the heat source to be safely manually operated. Also, a timer is not a suitable solution for a busy kitchen where multiple staff operate at the pass between the kitchen and restaurant, where the food warming equipment is placed, and who would not want to take responsibility or be distracted with the additional chore of constantly monitoring the presence of food and keeping the heat sources on.

By looking at prior art multiple patents have been found providing advancements in their own domain. For instance, a German patent 2,020,13006892U1 on Place Mat/Coasters to keep warm, warm and cool food and drinks is proposed. A place mat/saucer (1) that keeps food, food and drinks warm, warms and cools, which comprises: a heat resistant place mats/coasters (1) with an integrated arranged heat generating, heat storing and cooling substance (3) and a trigger element (2), the place mat/saucer (1) characterized in that it is positioned under crockery/container, and at the same time as a place mat/saucer (1) is used.

A US patent 2,014,0042172A1 relates to serving Mat having a Heated or Freezable Internal Medium discloses is a serving dish mat adapted to maintain the serving temperature of a supported article and further prevent damage to an underlying support surface. The mat comprises a geometric shape having a thermally insulating base surface, a thermally conductive upper surface and an internal gel-like material therebetween that is readily freezable or heated. The gel material is one of high specific heat capacity and high enthalpy of fusion that is pre-heated or frozen, after which it releases heat or draws heat through the thermally conductive upper surface for maintaining a serving dish temperature resting thereupon. The gel slowly dissipates heat when heated and absorbs considerable heat when frozen prior to returning to a liquid state. The base surface insulates the support surface from the temperature of the internal material, while a serving dish temperature is maintained over a period without active heating or cooling sources.

A US patent 2,007,0281058A1 relates to a utility package for heating or cooling liquids and food is disclosed. A self-heating package with an inner and outer bag. Heating is provided from the inner bag to the content in the outer bag. The package may be supported by an external box or a utility bag. Additional foam layer is provided to insulate the self-heating package. The utility bag may also provide heating from its internal chamber, thus increasing the heating to the bag-in-bag package.

A U.S. Pat. No. 4,827,107A discusses battery-powered food warmer. A food serving device for holding and serving a warm food product such as bread or rolls includes a flexible wrapper within a receptacle for holding the food product. A battery powered heater applies heat to the receptacle and wrapper and is located in a housing below the receptacle. The housing has a cover with heat transmitting openings.

A U.S. Pat. No. 6,297,481B1 relates to Infrared food warmer. An infrared food warming device is provided with one or more compartments having one or more food shelves. Food may be placed through an opening on such a food shelf in the compartment. An infrared energy generating sheet is positioned in the compartment on or adjacent to the food shelf. The infrared energy sheet includes a fiberglass support grid, a layer formed on support grid from a mixture of carbon and polymeric materials capable of producing infrared radiation in response to electrical current passed there through. A pair of electrical conduction power strips are attached along opposite sides of the layer and are attached to input power terminals to provide the required current. A polymeric laminate encloses the support grid, the layer and the electrical conduction power strips. The polymeric laminate is substantially transparent to infrared radiation so that it does not become excessively heated. An electrical power source is connected to the input power terminals for providing electrical power to be passed through the power strips and the layer of carbon and polymer mixture to generate infrared radiation that passes through the polymeric laminate and penetrates into the food on the shelf so that the food is warmed.

There are multiple solutions that have been presented in prior art. However, these solutions do not address the growing requirement to save energy and are not designed to be easily incorporated into equipment already implemented for keeping food warm in catering environments. Furthermore the prior systems have certain limitations including the design of assemblies which make them not suitable for every type of user.

The current invention discusses a system for use with catering equipment designed to keep food warm, involving a sensor and circuitry to ensure that a radiant heat source is only switched on, and thus drawing significant power, when items are placed directly under it. The system can be built into gantry solutions and other food warming equipment by the manufacturer or can be offered as an add-on or replacement module that can be retro-fitted to equipment in the field.

None of the previous inventions and patents, taken either singly or in combination, is seen to describe the invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The primary object of the invention is related to an instrument which is an advancement in devices in similar field of use.

It is further the objective of the invention to provide an energy-saving system for food warming equipment with food presence sensor.

It is also the objective of invention to provide warming apparatus which provides radiant heat to keep cooked food warm with a sensor that can detect the presence of items only directly beneath.

It is further the objective of invention to provide apparatus which can be controlled through related application.

It is also the objective of the invention to provide warming apparatus which has a durable structure and is well adapted for add-on unit that can replace or be added onto existing units used in food warming heating gantries.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
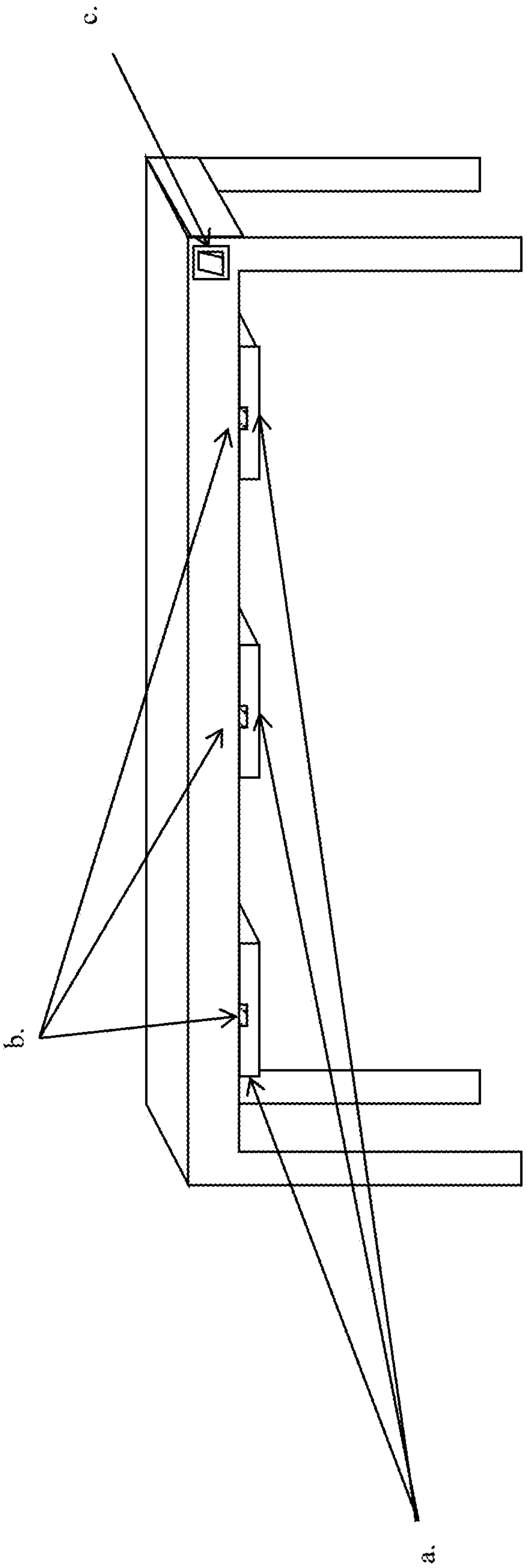
FIGS. 1 and 2 show the possible design for heated gantry with halogen lamps side and beneath views incorporating the invention.
Figure 2:
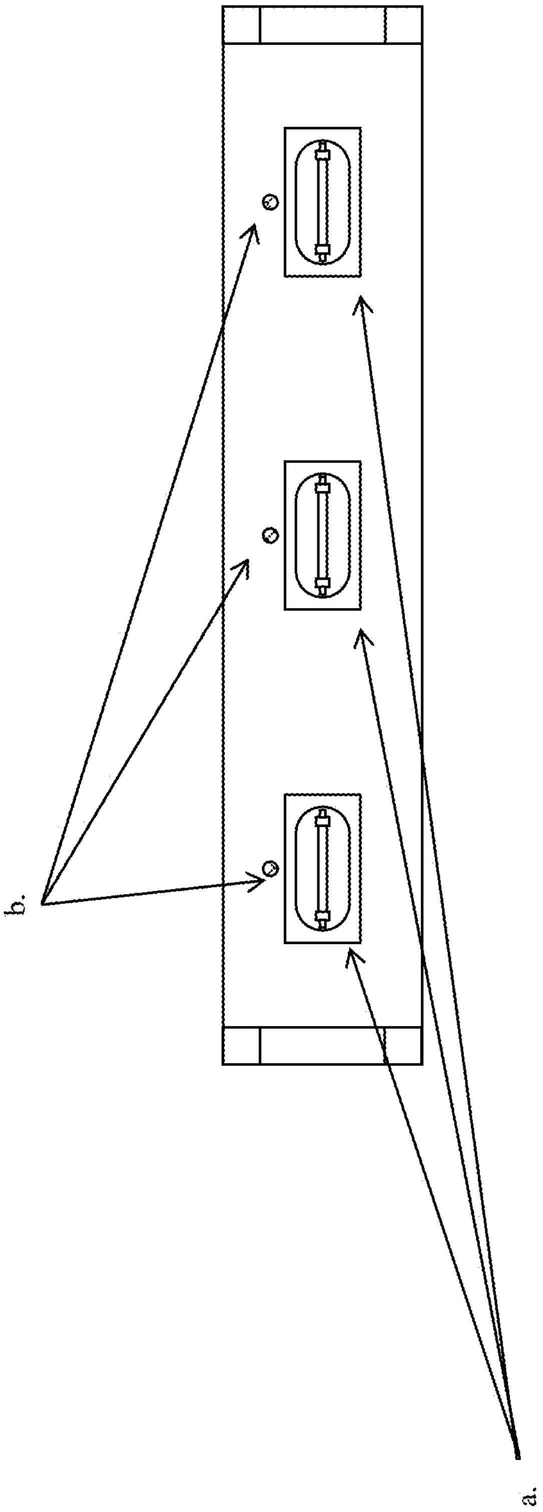
Figure 3:
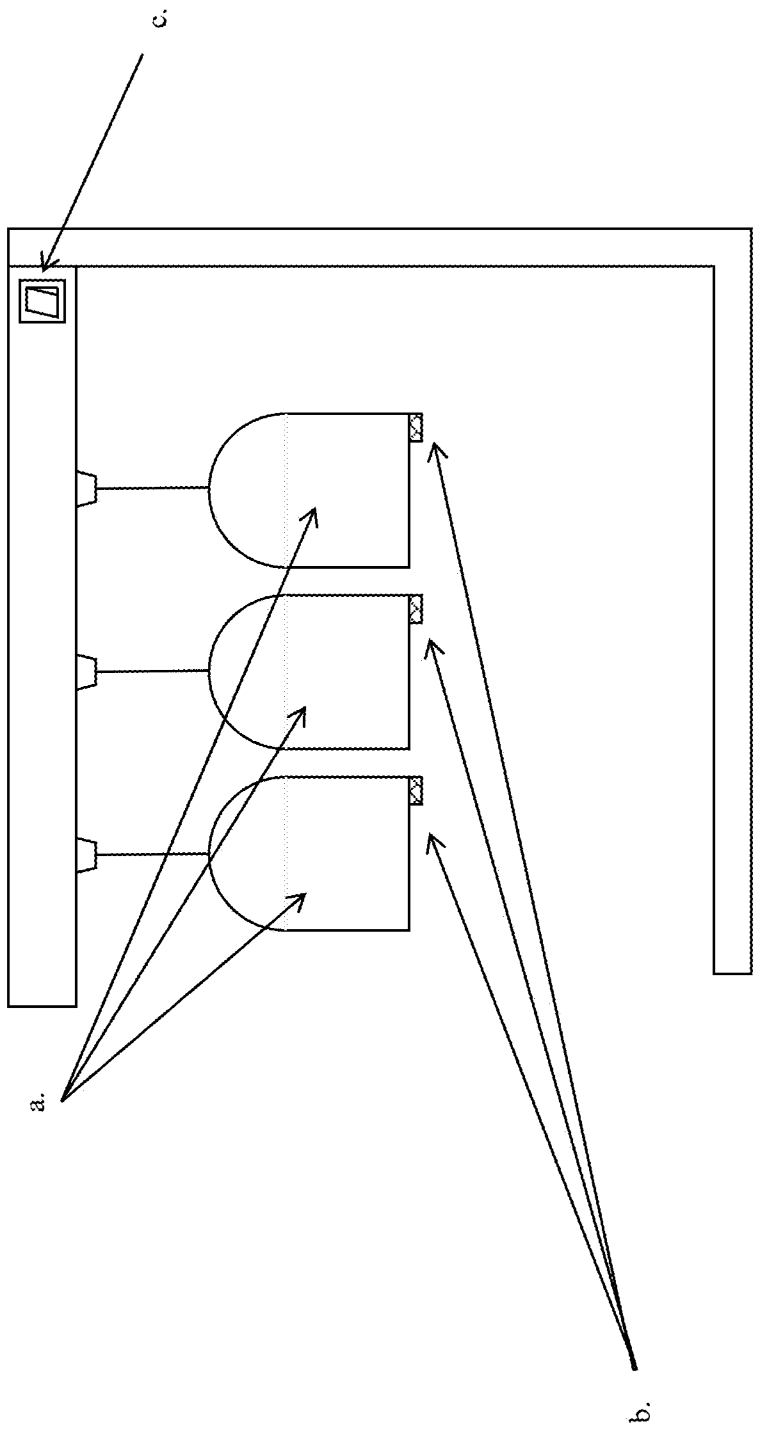
FIGS. 3 and 4 show the possible design for pendant style food warmer side and bottom view incorporating the invention.
Figure 4:
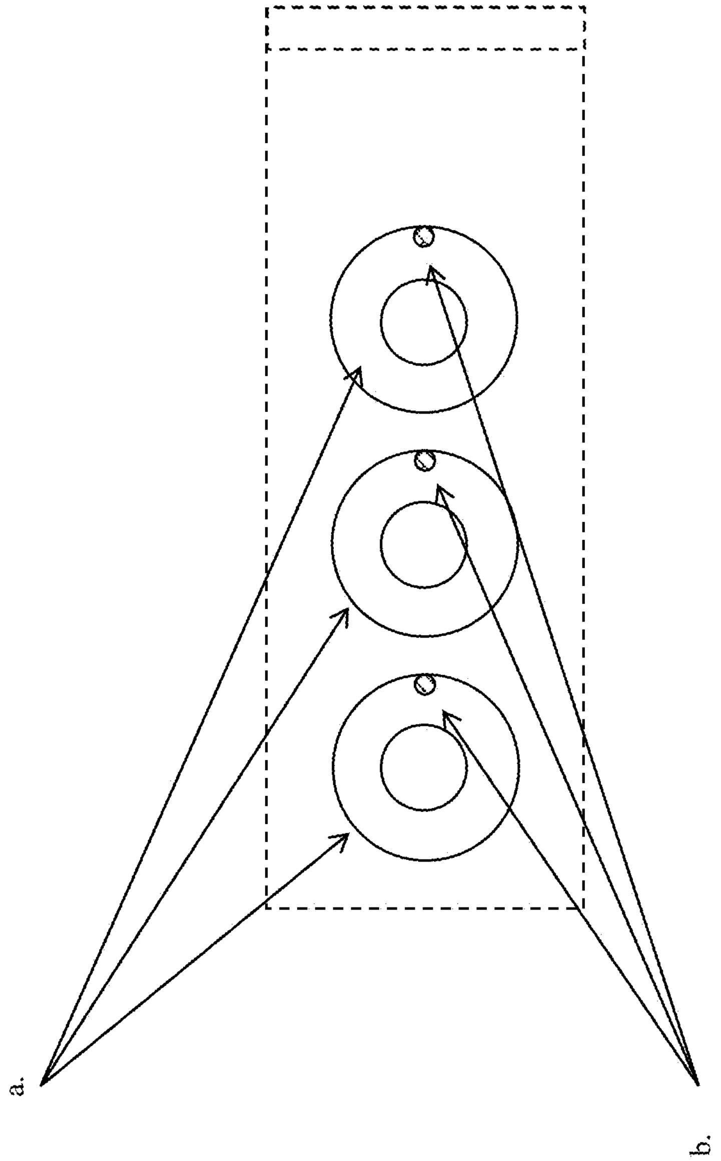
Figure 5:
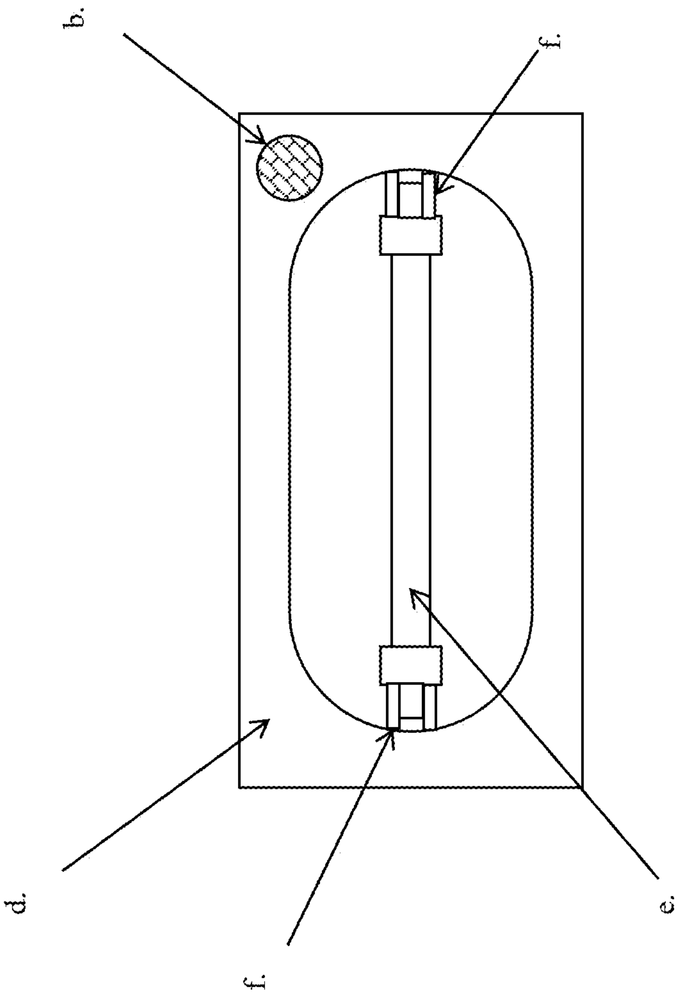
FIGS. 5,6,7 & 8 show the possible design for a retro-fit replacement halogen unit from right, left, top and bottom incorporating the invention.
Figure 6:
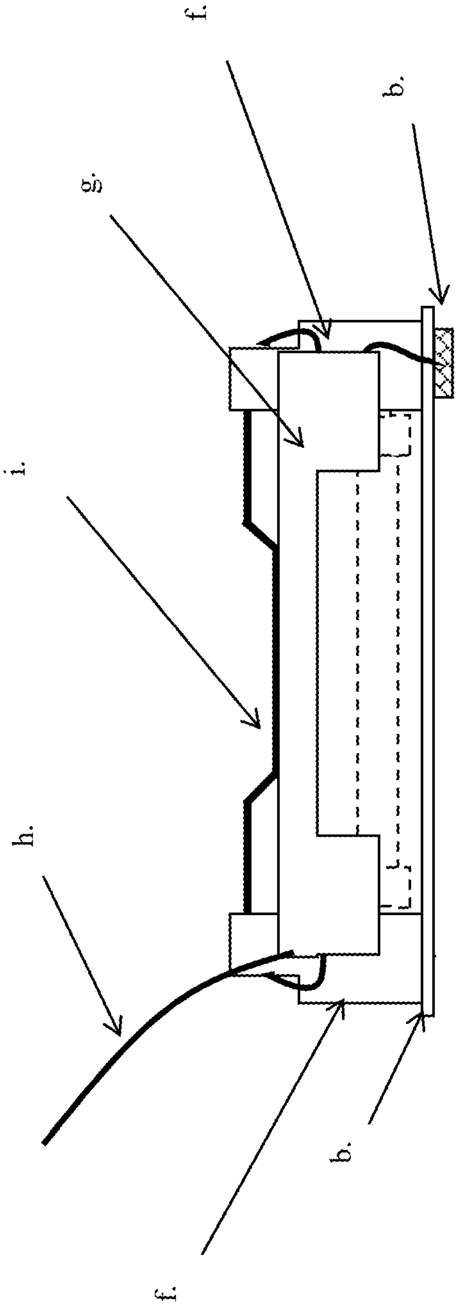
Figure 7:
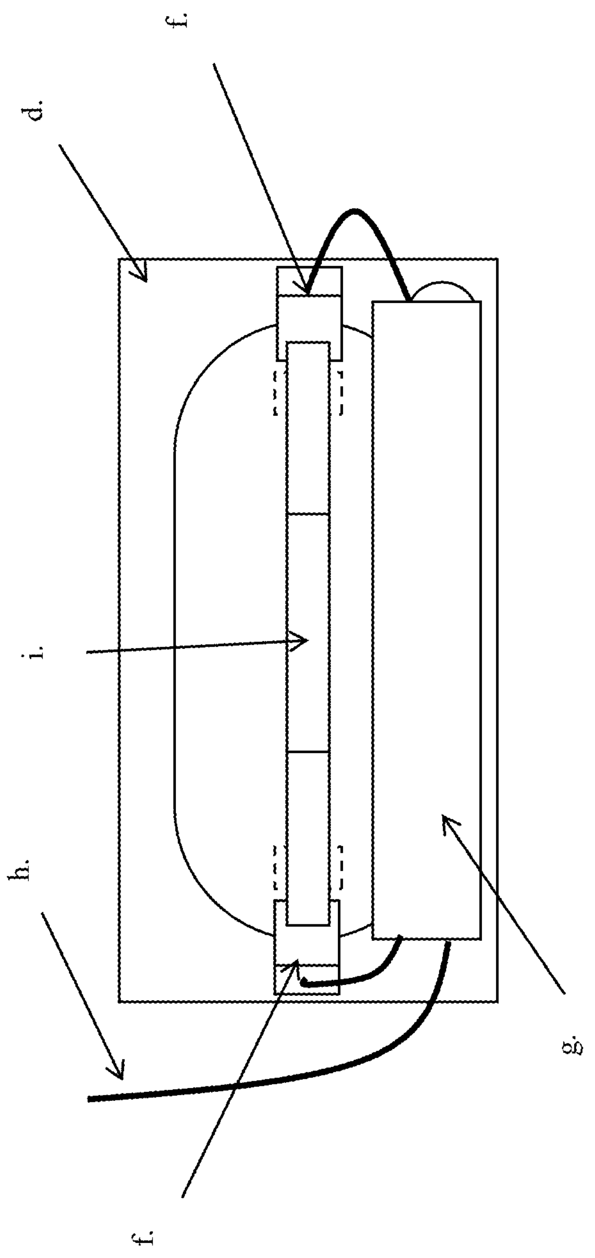
Figure 8:
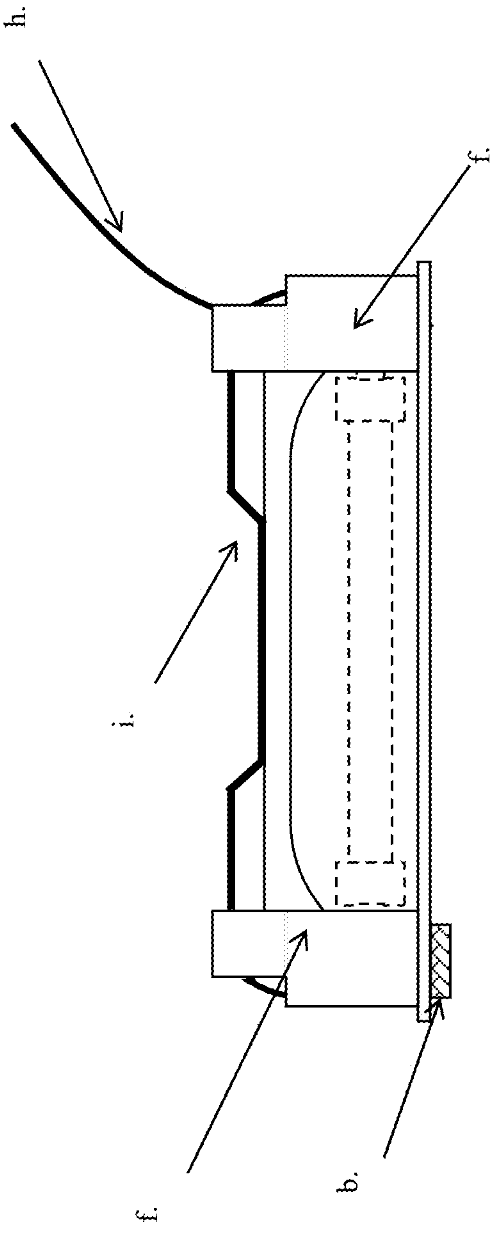

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

In many industrialized countries throughout the world the number of meals prepared and consumed outside of the home has steadily increased and is now estimated to exceed the number of meals prepared in the home. Many restaurants have been established to prepare, serve and/or deliver hot food to consumers. Particularly, significant for modern food consumption of prepared food are establishments known as fast food restaurants. Popular hot foods such as fried chicken, hamburgers, pizzas, and tacos are among some of the "staples" of the fast food industry. Purposes of cooking food and serving it hot are the same for home cooking, restaurants and fast food restaurants and include killing potentially harmful bacteria and certain viruses, terminating the growth of such potentially harmful microbes, and enhancing the flavor or otherwise improving the palatability of food.

The current invention as per its preferred embodiments provides a unique form of energy saving system with sensors to keep food warm evenly and effectively only when food is placed under it.

The assembly as shown in FIG. 1-11 can be utilized in multiple settings. The assembly consist of Heat lamp unit (a), Sensor (b) and Power switch (c) as shown in FIGS. 1, 2, 3 and 4. The FIGS. 5,6,7 and 8 show the retro-fit replacement halogen unit with Sensor (a), Reflector body (b), Bulb (heat source) (c), Bulb power contact (d), Bulb power contact (e), Circuit enclosure (f), AC power cable (g) and connection bar (h).

Figure 9:
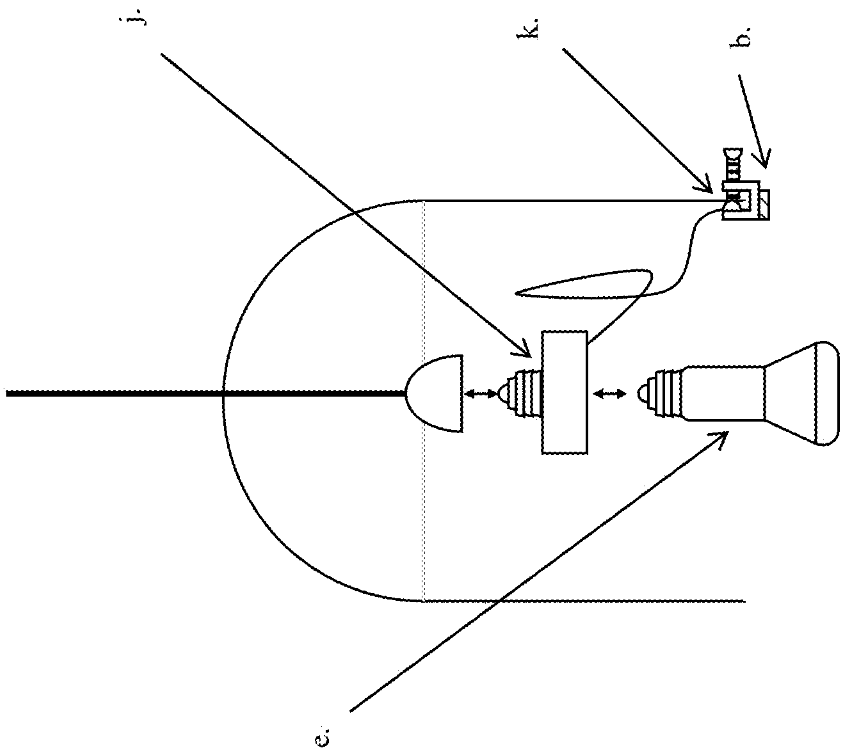
FIG. 9 shows the possible design for a retro-fit add-on for pendant-style heating equipment incorporating the invention with alternate attachment solutions.
Figure 10:
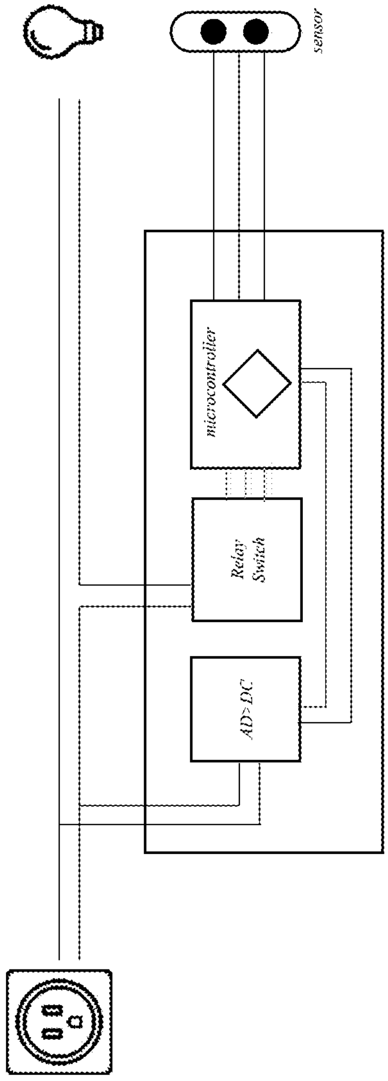
FIG. 10 shows the components and connections of the circuitry of the invention

The FIG. 9 shows retro-fit add-on for pendant-style heating equipment. The Interface unit features a male lamp attachment for connection to the original equipment and female lamp attachment for the heat source, Bulb and circuitry. The original heat source will be bulb and the Sensor will be attached to pendant body, which can be done mechanically with a screw clamp but could be any alternative, such as magnetic The FIG. 10 shows the components and connections which include AC as main power with a main circuit board consisting of AD>DC, Relay switch and Micro-controller. This is connected at backend with bulb as heating source and sensor to detect the food.

Figure 11:
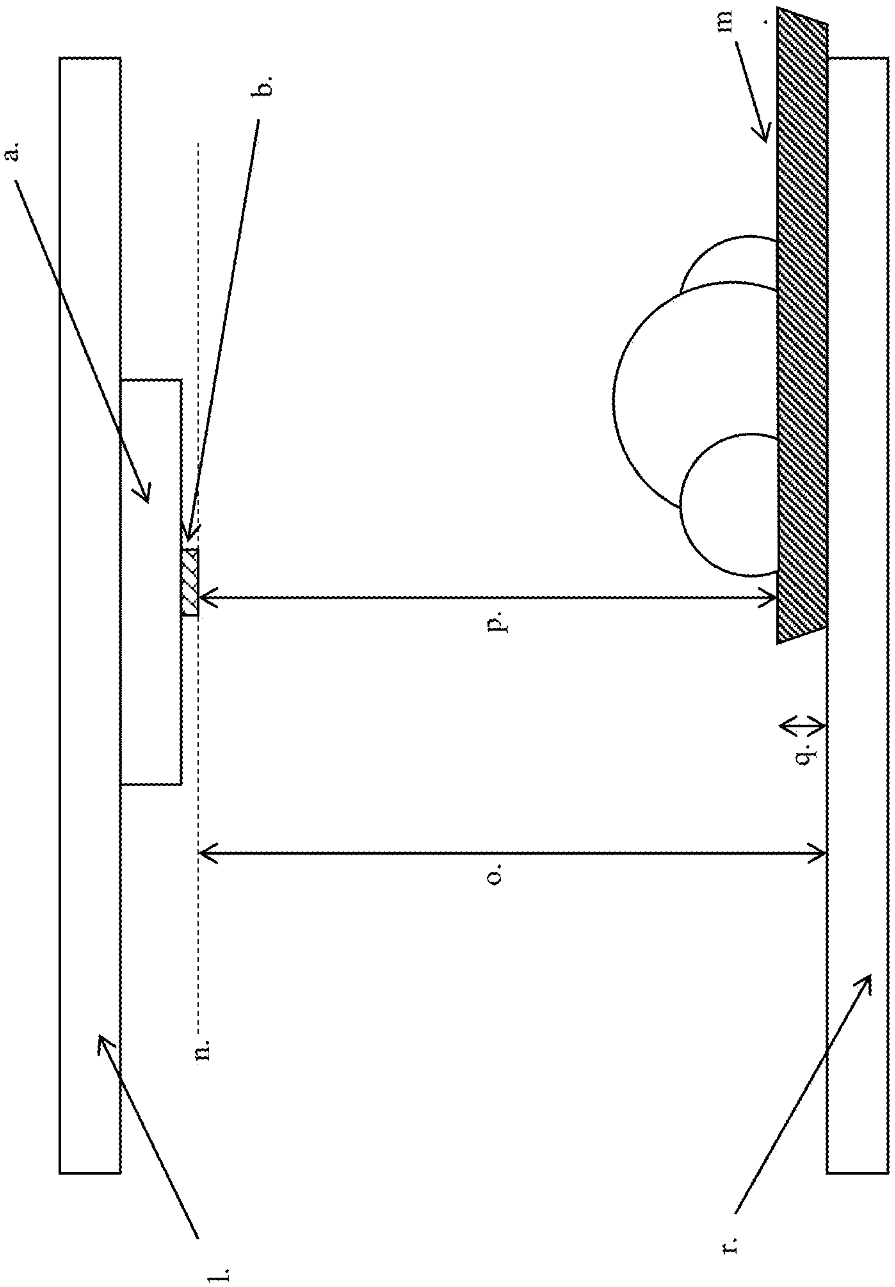
FIG. 11 shows the distance from the sensor changes when food and its carrier are introduced beneath it.

The FIG. 11 shows the distance from the sensor changes when food and its carrier are introduced beneath it. The configuration involves Top of gantry (a), heat source unit (b), sensor (c), Food carrier (d), Level of sensor (e), Distance to empty (f), surface (default), Reduced distance to food or food carrier (g), Increased distance when food/carrier removed (h) and Bottom of gantry (i).

The working of proposed invention involves a sensor and circuit associated with each individual overhead heat source incorporated in the food warming equipment (FIG. 1). The equipment is switched on, the circuitry is also powered up and the software calibrates the device and establishes the default distance between the sensor and the nearest surface, assumed to be the empty pass below as shown in FIG. 11. When the sensor registers a significant reduction in this distance (for instance 0.5 cm or 1%), it is assumed that a dish carrying food has been placed under the heat source, and power is supplied to it as shown in FIG. 11. When the measured distance returns to the default, the heat source is switched off as shown in FIG. 11. If the distance registered become significantly greater than the default distance (for instance 1% or more), the system recalibrates. This is to account for the possibility that the pass was not empty when the solution was first switched-on FIG. 11.

The assembly as per its further embodiments as shown in FIG. 11 consists of Sensor capable of measuring distance, a switch, such as a relay, to allow DC circuitry to switch an AC power source to the heat source, a microcontroller (incorporating a CPU, memory and I/O) for running code which is connected to the sensor and switch, code for monitoring the sensor readings and activating the switch under the correct conditions, circuitry for converting an AC electricity supply to DC for driving the sensor, microcontroller and switch, optional mechanisms for attaching the sensor and circuitry to existing equipment and optional wireless connectivity components.

The above circuitry and sensor could be incorporated in association with each heat source at the point of manufacture or alternately which is Incorporated with a heating unit holder that can be used to switch out a standard unit in equipment already in the field as shown in FIGS. 5,6,7 & 8. It is further Incorporated with a lamp holder that can be inserted between the original manufacturer supplied lamp holder and the heating lamp FIG. 9.

While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A food warming apparatus with sensors to detect the presence of food comprising of:

Heat lamp unit (a),
Sensor (b),
Power switch (c),
Reflector body (d),
Bulb (heat source) (e),
Bulb power contact (f),
Circuit enclosure (g),
AC power cable (h),
Connection bar (i),
Interface unit featuring a male lamp attachment for connecting to a female lamp attachment for the heat source bulb; plus, circuitry (j)
A Mechanism to attach the sensor to a pendant body,
Gantry (l),
Food carrier (m),
Level of sensor (n),
Bottom of the gantry (r),
wherein the sensor comprises a distance measuring sensor configured such that:

(i) when the apparatus is powered on, the circuitry automatically calibrates a default distance between the sensor and a nearest surface assumed to be an empty pass beneath the heat source;

(ii) when the sensor registers a reduction in the measured distance relative to the calibrated default distance, the apparatus determines that an object has been placed beneath the heat source and activates the heat source: and (iii) when the sensor subsequently detects that the measured distance has returned to the default distance, the apparatus deactivates the heat source;

wherein the circuitry is further configured to recalibrate the default distance when the measured distance exceeds the default distance by a predetermined threshold.

2. A combination of lamp or heating unit used to provide radiant heat to keep cooked food warm with sensors wherein:

the sensors of claim 1 are a built-in technology;

and configured such that: the sensors can detect the presence of items only directly beneath;

the sensors can measure distance to the nearest surface, such that a significant fall in the distance measured registers the introduction of an item placed directly under the sensor;

the sensors are capable of measuring distance;

wherein the sensors include but not limited to ultrasonic sensors, infra-red distance sensors, time of flight sensors and lidar sensors;

wherein the sensors are configured for automated calibration of the distance between sensor and the surface which requires heating when the circuit is powered on, and when an increase in measured distance is detected, in order to support many different heights of equipment without manual intervention and to eliminate the need for the presence of manual controls; and, the sensors provide option to incorporate wireless connectivity in the circuitry to allow for remote control and reporting with various features.

* * * * *